J. A. TAFT.
METHOD AND APPARATUS FOR MAKING CYLINDRICAL COTTON BALES.
APPLICATION FILED APR. 20, 1916.
1,316,202.
Patented Sept. 16, 1919.
3 SHEETS—SHEET 3.
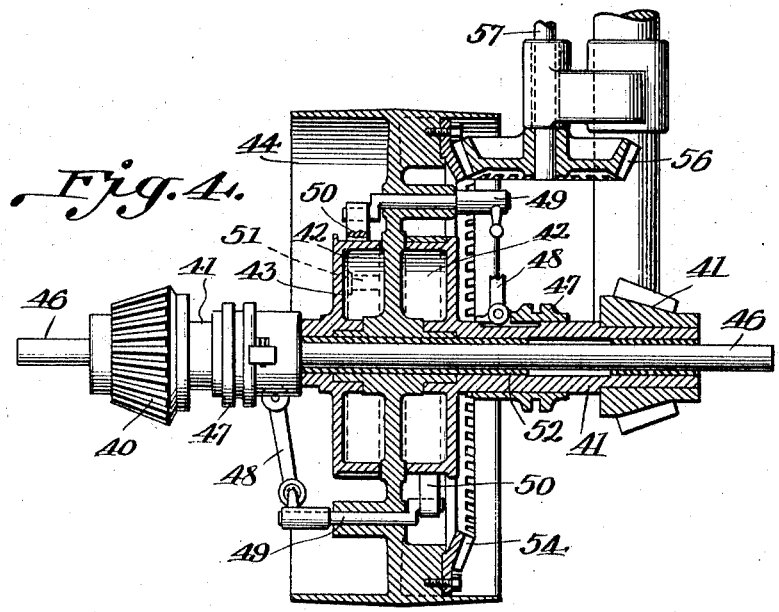
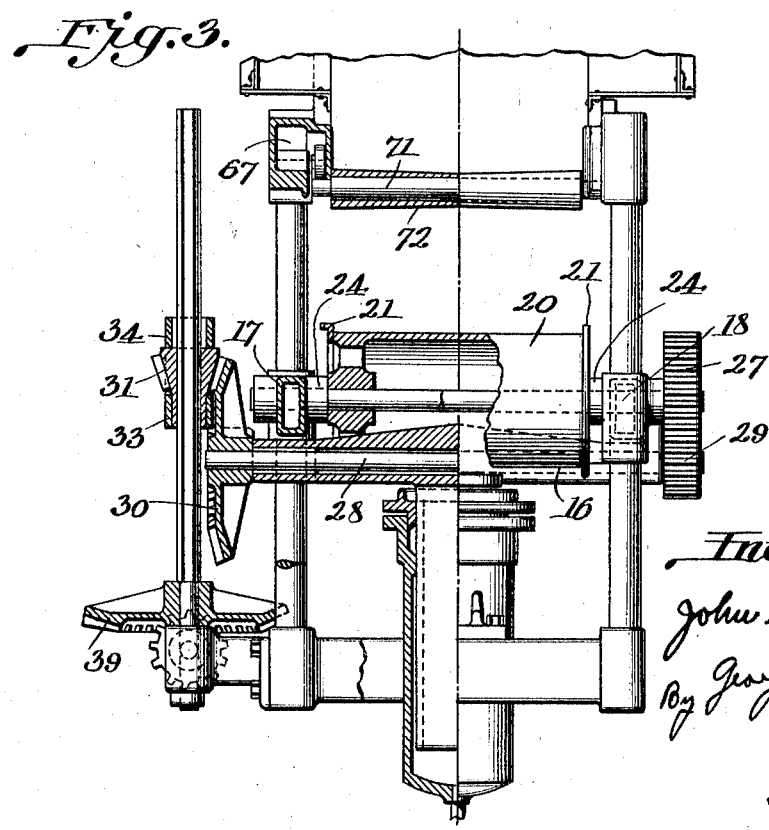

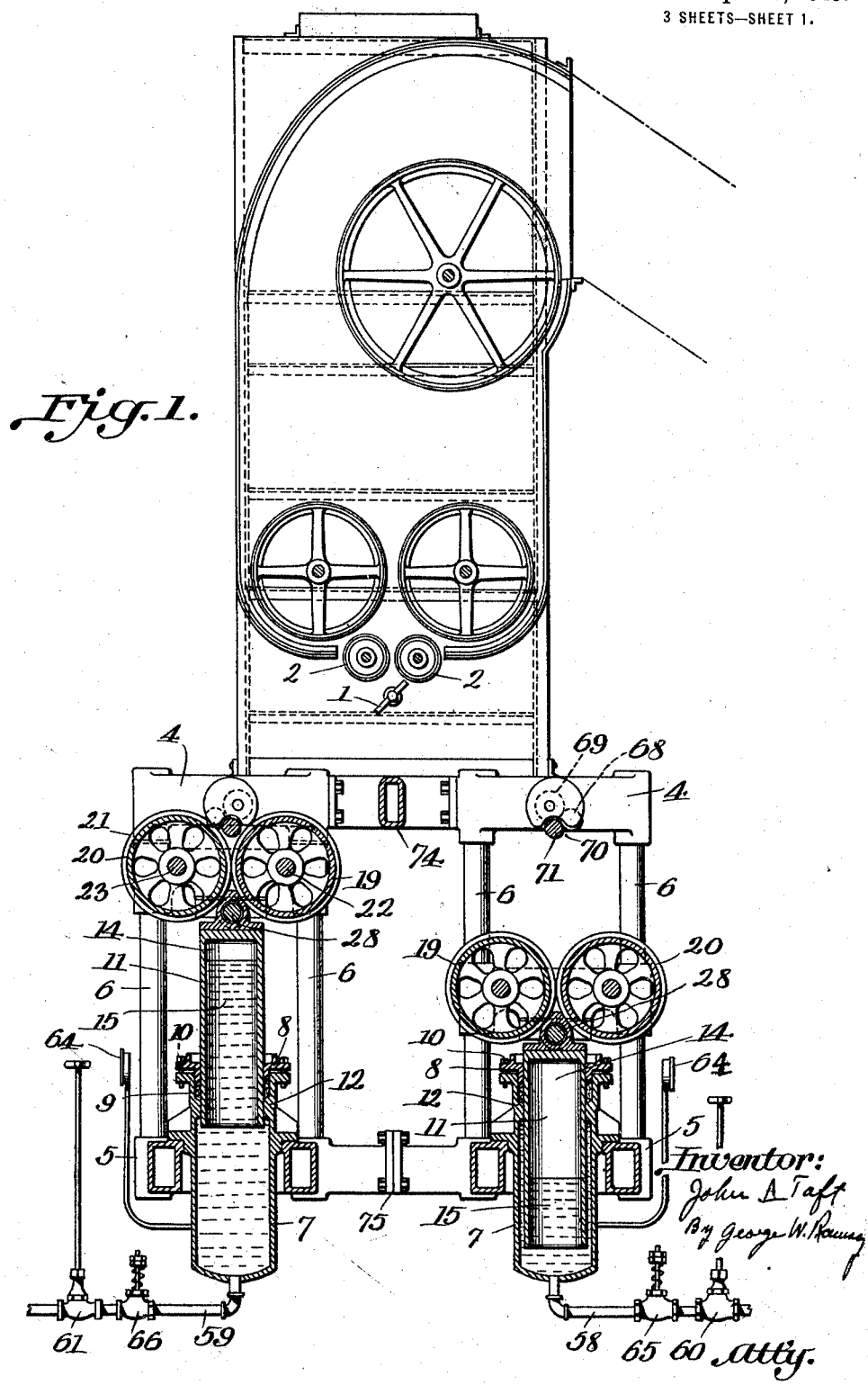

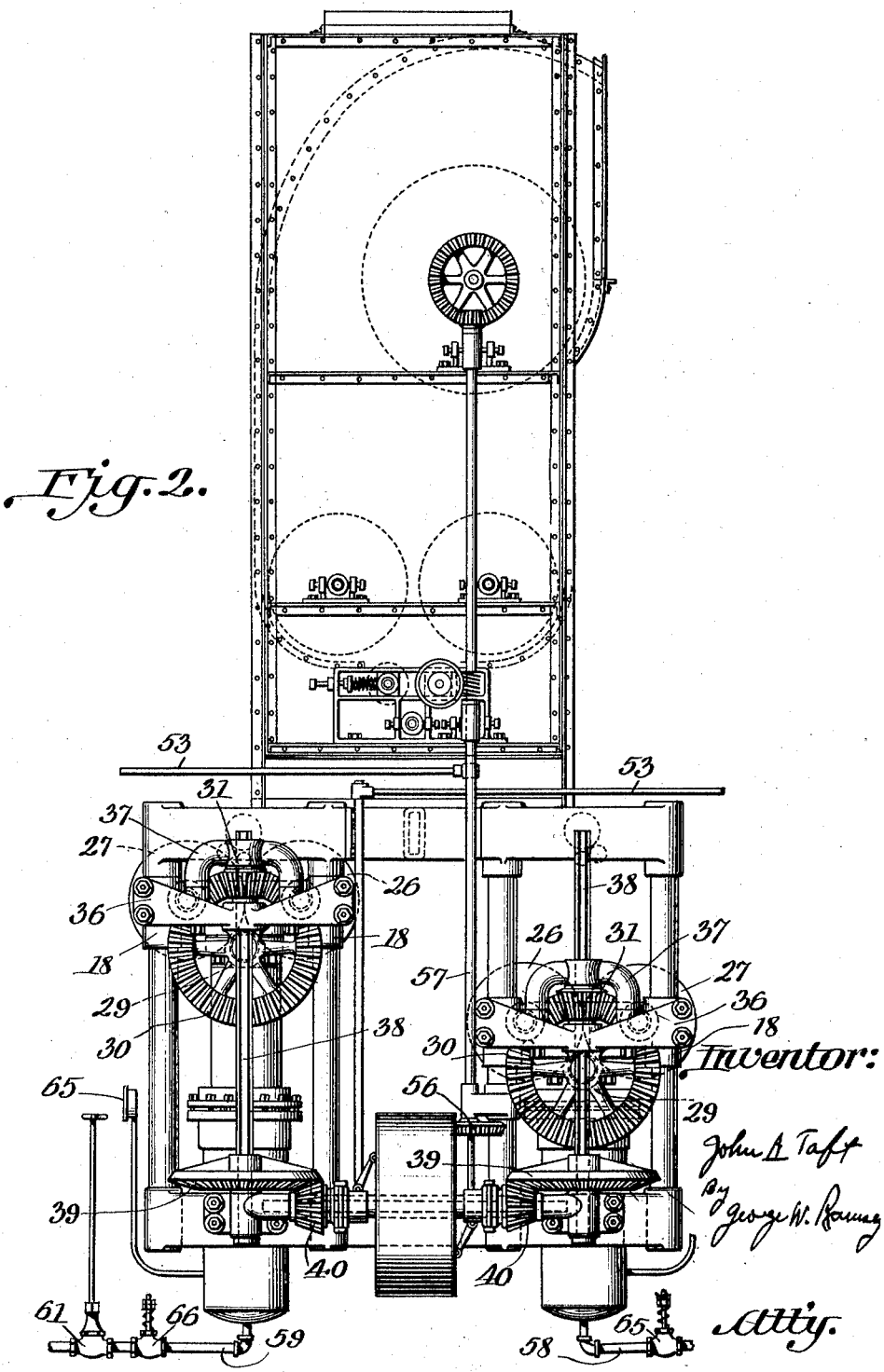

UNITED STATES PATENT OFFICE.

JOHN A. TAFT, OF SAN ANTONIO, TEXAS, ASSIGNOR TO REAGAN BALE COMPANY, OF SAN ANTONIO, TEXAS, A CORPORATION OF TEXAS.

METHOD AND APPARATUS FOR MAKING CYLINDRICAL COTTON-BALES.

1,316,202.  Specification of Letters Patent.  Patented Sept. 16, 1919.

Application filed April 20, 1916. Serial No. 92,391.

*To all whom it may concern:*

Be it known that I, JOHN A. TAFT, a citizen of the United States, and a resident of the city of San Antonio, in the county of Bexar, State of Texas, have invented certain new and useful Improvements in Methods and Apparatus for Making Cylindrical Cotton-Bales, of which the following is a specification.

This invention relates broadly to packaging and baling and more specifically to the method and to a machine for the forming of a cylindrical cotton bale.

One of the principal objects of this invention is to provide a machine for making cylindrical cotton bales of substantially uniform density without matting, stretching, or injuring the cotton fibers.

A further object of this invention is to provide a mechanism for forming a cylindrical cotton bale in which mechanism is provided means for compressing successive layers of cotton into a cylindrical bale without subjecting the cotton fibers to destructive stretching action.

Another object of this invention is to provide a cylindrical cotton bale press wherein the compressing action is maintained between a member at the center of the bale and members having peripheral line contact with the bale, and then revolving the last mentioned members at the same speed to cause the layers of cotton to be wound and compressed upon the periphery of the bale when it is being formed.

A still further object of this invention is a machine for compressing cylindrical cotton bales wherein the bale is formed between a rotary core having a stationary rotating axis, and wherein the compressing forces are exerted between the said core and receding compression rolls located beneath said core and driven at the same peripheral speed thereby rotating the bale by surface contact and at the same peripheral speed as the rolls to obviate stretching of the cotton fibers while the bale is being formed.

A still further and primary object of this invention is the method of forming a cylindrical cotton bale, which method comprises more particularly the wrapping and compressing without stretching, of a plurality of superimposed layers of a cotton bat.

It is also a principal object of this invention to provide a method of producing a cylindrical bale of cotton of substantially uniform density, by wrapping a cotton bat in superimposed layers, each layer being subjected to combined pneumatic and hydrostatic pressure.

A still further object of the present invention is the method of forming a cylindrical cotton bale which method comprises the forming of said bale between compression members constructed to be yieldingly separable under forces of predetermined magnitudes wherein one of said compression members comprises a core around which said bale is formed, said core being mounted in stationary bearings, and the other of said compression members comprises rotatable compression rollers having the same peripheral speed as the peripheral speed of said cylindrical cotton bale, thereby preventing excessive stretching of the cotton fibers as the bale is being formed.

Other and further objects of the invention will in part be obvious and will in part be pointed out hereinafter by reference to the accompanying drawings forming a part of this specification and wherein like characters are used to represent like parts throughout the several views thereof.

Figure 1 is a view showing the major elements of my machine in sectional elevation. Fig. 2 is a side view showing the machine in elevation. Fig. 3 is a detail view showing a part of the single press in end elevation and also showing portions of the mechanisms in section. Fig. 4 is a detail view of the driving clutch.

Heretofore in the art of forming cylindrical cotton bales, various types of compression roll presses have been used. In some devices no core pin is used whereas in others a central member comprising a core is used to assist in forming a beginning for the bale. In one class or group of presses for forming cylindrical cotton bales the compression rollers are grouped around the axis of the bale in such manner that the compression forces from the several rollers are transmitted entirely through the bale from one side to the other to maintain said forces in equilibrium. In this type of roll press the compression rolls have heretofore either been arranged oppositely disposed with the axis of rotation of the bale substantially midway between the sets of rollers, or the rollers have been spaced equally around the core, for example, one hundred and twenty degrees apart around the bale forming axis.

In the second group or type of devices to which the present invention relates, a core has been relied on as a sole member to comprise one of the compression devices and the rollers comprising the other member of the compression device have been arranged on one side only of the core so that the compression forces are transmitted radially only through a portion of the bale. As an example of the latter class is my former Patent No. 1,145,630. In all devices of this class or character the rollers have either been of unequal size or they are constructed to have unequal peripheral speed to produce a stretching of the cotton bat around the bale as it is being formed to produce density by wrapping in a manner similar to producing a dense roll of cloth or paper.

My present invention which includes a method that may be carried out in various ways, preferably by a mechanism which will hereinafter be more fully described, differs from the foregoing and from all other methods with which I am acquainted, by producing a cylindrical cotton bale by means of radially exerted forces that are applied to one side only of the bale during the superimposing of successive layers of cotton bat, without stretching the cotton fiber. This method is primarily a method of compression and not a process of stretching and wrapping.

By experience I have found that opposed rolls on each side of the axis of the cotton bale have a tendency to cause working or movement of the various layers of cotton one upon the other in a manner that is injurious to the cotton fiber. I have also found that it is not the most desirable way of baling cotton to stretch the cotton bat during the baling action, as there is more or less of a tendency of intermatting and consequent danger of breaking and injuring the cotton fibers. To obviate these difficulties and to carry out my method, my machine includes a revolving core preferably mounted upon anti-friction bearings to reduce to a minimum any possibility of stretching that might be caused by rotative resistance of the core. This core is preferably mounted in such manner that its axis of rotation is stationary. Beneath this core I provide compression rollers, preferably two, which are positively driven in such manner that their peripheral speeds are equal and are exactly the speed of the periphery of the rotating bale. These rollers are mounted upon a strong frame which recedes, as the bale enlarges against yielding pressure under control of the operator, whereby predetermined compression forces are exerted on the bale between said core and said compression rollers. It is to be noted that these forces are substantially entirely radial forces and that stretching is reduced to a negligible minimum. This mechanism produces a cotton bale wherein the forces within the bale when it leaves the machine are substantially radial forces so that there is no tendency of the various layers to work one upon the other. There is no tendency of the intermatting of the fibers, nor is there any presence of destructive forces tending to break or tear the individual cotton fibers, at the same time the bale is of the required density and the density is substantially uniform throughout the entire bale.

Referring more particularly to the drawings and more especially to Fig. 1, the bale forming mechanism is shown preferably in the form of twin presses located beneath a condenser mechanism which is commonly used to receive the cotton as it comes from the cotton gin. The twin presses are constructed to be operated in alternation so that while the bale is being removed from one press another bale is being formed by the other and to facilitate this a directing chute or gate 1 is provided beneath the condenser rollers 2, whereby the cotton bat is directed to either one or the other of the presses as is desired. Each press includes a head frame 4 and a base frame 5 between which extend vertical guides 6. Mounted within the said base frames are stationary cylinders 7 which are provided with large glands 8 which are adapted to compress the packings 9 located in the recesses in the heads of the cylinders 7. These glands are adapted to be adjusted by means of head bolts 10 to regulate the pressure upon suitable packing gaskets. Hollow pistons 11 are adapted for vertical movement in said cylinders 7 and are constructed to be guided in their vertical movement partly by the glands 8 and partly by annular rings 12 within the said cylinders.

The pistons 11 are hollow to provide chambers which trap a volume of air 14 above the water 15 as is shown in Fig. 1. This construction provides an elastic cushion which produces an even pressure against the bale irrespective of variations in the thickness of the bat. Since water of itself is substantially incompressible it is practically impossible to produce an even pressure by means of hydro-static pressure alone. Where the bat is of varying thickness and hydro-static pressure alone is used very great pressure is exerted on the thick portions of the bale, due to a thick spot in the bat, while the thin portions are subjected to relatively little pressure, thereby producing a bale of uneven density. By my method, and machine, however, the elasticity of the air cushion 14 enables the press operator to maintain substantially the same effective pressure in operation irrespective of variations in the bat, as specified. Furthermore, this air cushion 14 enables the operator to more accurately control the pressures delivered which is important since at the beginning of the formation of the bale less force is used and at the finish of the bale a maximum pressure is used. It will be seen that by holding the water level at a predetermined point the compression rolls yield to gradually increase the air pressure 14 and thus automatically increase the effective compressing force as desired. Furthermore, by making the pistons 11 hollow the weight of moving parts is reduced and pressure operating on the pistons is applied as near the working or upper end thereof as is possible. This construction eliminates to a large extent undesirable side thrusts and requires in each press cylinder but one tight joint, i. e., the joint between the respective gasket 9 and the piston 11. The upper ends of the pistons carrying cross bars 16 which support large sliding cross heads 17. The cross heads 17 are each provided with four vertical sleeves 18 that slide upon and are guided by the vertical guides 6. These large cross heads 17 carry bearings on which are mounted the shafts of the compression rolls 19 and 20. These compression rolls are all of exactly the same size and are provided at their edges with small flanges 21.

As previously stated the compression rolls 19 and 20 are mounted upon shafts designated as 22 and 23, respectively, which shafts are mounted in suitable bearings 24 in the cross heads 17. These shafts carry gear wheels 26 and 27 which are of the same diameter and are respectively fixedly connected with the shafts 22 and 23. The cross bars 16 are provided with bearings in which are mounted the compression roll driving shafts 28. These shafts are provided with small gears 29 which are in mesh with each pair of the gears 26 and 27 whereby the pairs of gears 26 and 27 and through them the shafts 22 and 23 and the compression rolls 19 and 20 are driven in the same direction, so that the peripheral speed of the compression rolls 19 and 20 is identically the same. The opposite ends of the shafts 22 are provided with relatively large bevel gears 30 which mesh with small bevel gears 31. These small gears 31 are provided with bearings 33 and 34, respectively. The lowermost of these bearings are formed with brackets 36 which may be bolted to the cross heads 17, and the upper bearings 33 are formed in large bridges 37 which are secured to the brackets 36. These small gears 31 are mounted to slide on vertical driving shafts 38, the cross section of which shafts is a polygon so that as the shafts 38 rotate the gears 31 are driven. The lower ends of the vertical driving shafts are provided with large bevel gears 39 fixedly mounted upon said shafts and constructed to mesh with bevel pinions 40 that are fixedly secured to the tubular shafts 41. (See Fig. 3). The other end of the tubular shafts 41 carry narrow faced drums 42. These drums lie adjacent to the spokes 43 of a driving pulley 44 which is mounted to rotate upon a supporting shaft 46. These tubular shafts 41 carry sliding collars 47 to which are attached arms 48 that are connected to and adapted to rotate eccentrics 49, one end of each of which is connected with friction bands 50 that are anchored to the driving pulley 44. The tubular shafts 41 are provided with suitable bearings 52 whereby these said shafts also may rotate upon the supporting shaft 46. The sliding collars 47 are provided with suitable hand levers and connections 53 so that either of said collars may be slid in such manner as to draw either or both of said friction bands 50 tightly around their respective drums 42 thereby positively driving either the right or left hand press, or both, at the will of the operator. The driving pulley 44 is provided with a large annular bevel gear 54 which is constructed to drive a small bevel gear 56 on a long vertical shaft 57 which through a suitable construction drives the condenser mechanism hereinbefore referred to.

Connected with the vertical cylinders 7 are discharge pipes 58 and supply 59. All of these pipes are provided with control valves 60 and 61, respectively, whereby the discharge of water from the pressure cylinders 7 is entirely under control of the operator so that he may adjust and control the speed with which the hollow pistons 11 move up from or recede into the vertical cylinders 7 and thus control the pressure during the baling operation by observing the pressure gages 62 and 64. These pipes may also be equipped with spring controlled relief valves 65 and 66 that can be adjusted to make the operation automatic. The supply pipes are connected with suitable pumps, not shown, which at all times are operative to produce the necessary pressure to operate hydraulic devices and their respective gearing as the operation of the machine may require.

The side members of the head frames 4 are provided with housings 67 in which are mounted small bearing rollers 68 and large bearing rollers 69. The housings are undercut as at 70 to permit the ends of the core bars 71 to engage the anti-friction rollers 68 and 69. These core bars 71 are covered with oppositely disposed conical sleeves 72 with the small ends of the cones abutting at the center of the core bar. The right and left hand presses are joined together by connecting the head frames as at 74 and also connecting the base frames as at 75.

Particular attention is directed to the arrangement of the anti-friction rollers wherein it will be noted that the majority of the forces are supported upon the larger roller 69. This arrangement tends to largely reduce friction because the forces are more nearly through the line of contact between the end of the core bar and the large roller 69 than would be the case if two rollers of the same size were set with their axes in a horizontal plane parallel to the axes of the compression rolls 19 and 20.

Assuming the parts to be in the position of the press shown on the left hand side of Fig. 1, i. e., with the compression rolls raised adjacent the core bar, the operation of the device is substantially as follows: The cotton bat formed in the condenser is led beneath the core bar and assuming that the left hand lever 53 is operated to render the driving clutch operative to drive this particular left hand press, the compression rolls will rotate in an anti-clockwise direction thereby leading the bat of cotton beneath the core bar and causing the core bar to rotate in a clockwise direction. Since both compression rolls 19 and 20 are positively rotated at exactly the same peripheral speed there will be no longitudinal stretching action whatever so far as the cotton fibers in the cotton bat are concerned, and the forces tending to compress the cotton are exactly radial of the bale in lines connecting the axis of the core bar with each axis of the compression rolls. As the cotton bat continues to be wound around the core bar, the bale increases in size and this increase is resisted by the fluid between the stationary cylinder 7 and the hollow piston 11 of the left hand press. Since the valve in the discharge pipe 65 is under control of the operator this resisting force can be increased or decreased by regulating the tension of the spring in a relief valve or by closing or opening the said discharge valve, thus making the compression forces entirely under the control of the operator and may be observed by watching the pressure gage. As the bale gradually forms, the hollow piston moves downwardly, and the parts gradually assume the position shown in the view at the right hand side of Fig. 1. At this time the gate 1 is turned to feed the bat to the opposite press and the bale just formed is properly tied and removed from the machine.

In the drawings no foundation has been shown beneath the presses, but this, of course, is obvious and the foundation has been omitted in order that the parts may be shown without confusion.

It is again particularly pointed out that in this method of forming a cylindrical cotton bale the radial forces are the primary factors in producing the bale and thus intermatting of the fibers is obviated.

Realizing that it is possible to vary the physical and mechanical elements comprising my machine as illustrated for carrying out my method of producing a round cotton bale, I desire that the specific mechanism disclosed in the drawings and described hereinbefore shall be considered as illustrative and not in a limiting sense.

Having thus described my invention what I desire to claim is:

1. The method of forming a cylindrical cotton bale which consists in wrapping a sheet of cotting batting around a core in successive superimposed layers, compressing said sheet continuously as it is wrapped into a bale by applying a plurality of yielding radial forces all effective at one side only of said bale, and rotating said bale in such manner as to obviate stretching the cotton.

2. The method of forming a cylindrical cotton bale which consists in wrapping a plurality of superimposed layers of cotton batting around a non-yielding core, successively subjecting each portion of said sheet of cotton batting to a plurality of compression radial forces all effective at one side only of said bale, then rotating said bale without stretching the wrapped cotton batting.

3. The method of forming a cylindrical cotton bale which consists in coiling a sheet of cotton batting around a non-yielding core and subjecting all of said cotton batting wound upon said core successively to a yielding gradually increasing compression force exerted radially on one side only of said cotton bale, and rotating said cotton bale by said force during said coiling movement without stretching the cotton fibers.

4. The method of forming a cylindrical cotton bale which consists in wrapping a sheet of cotton batting around a core and applying a plurality of yielding compression forces to the exterior of said bale as said bale is formed in such manner that said forces are applied without stretching said cotton fibers and so that said forces are all applied entirely to one side of said bale and do not extend beyond said core.

5. A method of forming a cylindrical cotton bale which consists in applying a plurality of similar yielding compression forces to a sheet of cotton batting, then wrapping said cotton batting around a non-yielding core, then rotating said bale by said forces to produce a wrapping action without stretching the cotton fibers.

6. The method of forming a cylindrical cotton bale which consists in rolling a sheet of cotton batting upon itself under a yielding pressure, which pressure is gradually increased as the bale is formed and without stretching the fibers of said cotton batting and in such manner that all of the compression forces are exerted wholly on one side only of said round bale.

7. In a cylindrical bale cotton press in combination, a frame, a hydraulic cylinder mounted in the lower portion of said frame, a hollow piston adapted to form an air trap and mounted to travel within said cylinder to gradually increase the air pressure in the cylinder throughout the entire descent of the piston, a cross head, guide rails provided for said cross head, a core bar, means to detachably retain said core bar in position directly over said hydraulic cylinder, compression rolls rotatably mounted upon said cross head in a plane below said core bar, and means to rotate said compression rolls in such manner as to produce an equal peripheral speed for all of said compression rolls.

8. In a cylindrical bale cotton press in combination, a framework, a hydraulic cylinder mounted in said framework, a hollow piston adapted to form an air trap and mounted for vertical reciprocation in said hydraulic cylinder, a cross head carried by said hollow piston, guides for guiding the vertical movement of said cross head, a pair of compression rolls mounted in said cross head, a core bar, a downwardly opening bearing adapted to sustain said core bar against upward forces, and driving means for rotating said compression rolls to produce equal peripheral speeds for all of said rolls.

9. In a rotary cotton press in combination, a frame, hydro-pneumatic devices carried by said frame, a core bar, means to support said core bar to enable said core bar to sustain forces controlled by said hydro-pneumatic devices, compression rolls for transmitting said forces to said hydro-pneumatic devices, and driving means for said compression rolls to provide the same peripheral speeds for all of said compression rolls.

10. In a cylindrical bale cotton press in combination, a framework, a hydraulic cylinder mounted in said framework, a hollow cylindrical piston adapted to form an air trap and mounted for movement in said hydraulic cylinder, a core bar, means to support said core bar to receive forces from said piston, and means to compress and wrap a sheet of cotton batting around said core bar without stretching the fibers within said sheet of cotton batting.

11. In a device of the class described in combination, a framework, a non-yielding core mounted for rotation on said framework, means to wrap a sheet of cotton batting around said core without stretching the cotton fibers, and devices for producing yielding compression forces between said first mentioned means and said bale, said devices being constructed to apply said compression forces to one side only of said bale.

12. In a device of the class described in combination, a framework, anti-friction bearings mounted in said framework, a non-yielding core adapted to coöperate with said anti-friction bearings to enable said core to rotate freely within said bearings, means for wrapping a sheet of cotton batting around said non-yielding core and for compressing the cotton by rolling said cotton batting as the same is being wrapped, driving gears for rotating said means in such manner as to obviate stretching of the cotton fibers while said sheet of cotton is being wrapped, and hydro-pneumatic compression devices constructed to produce yielding compression forces between said means and said non-yielding core in such manner that said compression devices are exerted wholly upon one side of the cotton wrapped around the core.

13. In a device of the class described in combination, a framework, a bearing in the upper portion of said framework, a non-yielding core adapted to be detachable from and to rotate in said bearing, a cross head, a pair of compression rolls mounted to rotate in said cross head in such manner that a vertical plane including the axis of said core will pass between said compression rolls and be equi-distant from the axis of each of said compression rolls, devices to supply the sheet of cotton batting to said core, means to set up compression forces between said compression rolls and said core, and driving devices for driving said compression rolls in such manner that the peripheral speed of both of said rolls is identically the same.

14. In a device of the class described in combination, means comprising a plurality of rolls for rolling a sheet of cotton batting upon itself without stretching the fibers of said cotton batting, and yielding pressure means coöperative with said rolls to cause the said rolls to exert a plurality of yielding radial pressures all effective on one side only of the roll of said cotton batting to compress said cotton batting and form a cylindrical cotton bale without stretching the cotton fibers.

15. In a device of the class described in combination, means comprising a plurality of rolls for rolling a sheet of cotton batting upon itself, means for rotating said rolls to form the roll of cotton without stretching said cotton batting, and yielding pressure means coöperative with the said rolls to cause the said rolls to exert radial compression forces all effective on one side only of said roll of cotton batting, said forces being exerted beyond the tangent line where the unwrapped cotton batting is first brought in contact with the batting already rolled upon itself.

16. In a cotton bale forming apparatus, in combination, a fluid chamber, a piston operable therein, an air chamber in said piston, a stationary core, compression rolls coöperating therewith, and means on said piston for supporting the compression rolls whereby the piston is forced downwardly as the bale being formed increases in size to gradually increase the air pressure in said piston.

17. In a press for forming a cylindrical bale of cotton, a frame, devices to feed a sheet of cotton batting, means to coil said sheet upon itself, in combination with compression means comprising a hydrostatic device to sustain hydrostatic forces, and means to trap a volume of air in open unrestricted communication with the fluid medium in the hydrostatic device whereby the effective force delivered may yield due to the elasticity of the trapped air.

JOHN A. TAFT.

Copies of this patent may be obtained for five cents each, by addressing the "Commissioner of Patents, Washington, D. C."